United States Patent
Astafyeva et al.

(10) Patent No.: US 12,152,716 B2
(45) Date of Patent: Nov. 26, 2024

(54) HEATING SHELL FOR THREE-WAY CONNECTOR

(71) Applicant: HUTCHINSON, Paris (FR)

(72) Inventors: Ksenia Astafyeva, Montargis (FR); Thierry Benard, Checy (FR)

(73) Assignee: HUTCHINSON, Paris (FR)

(*) Notice: Subject to any disclaimer, the term of this patent is extended or adjusted under 35 U.S.C. 154(b) by 352 days.

(21) Appl. No.: 17/758,860

(22) PCT Filed: Jan. 18, 2021

(86) PCT No.: PCT/EP2021/050965
§ 371 (c)(1),
(2) Date: Dec. 21, 2022

(87) PCT Pub. No.: WO2021/148358
PCT Pub. Date: Jul. 29, 2021

(65) Prior Publication Data
US 2023/0194031 A1    Jun. 22, 2023

(30) Foreign Application Priority Data

Jan. 20, 2020   (FR) ....................................... 2000532
Oct. 16, 2020   (FR) ....................................... 2010638

(51) Int. Cl.
*F16L 53/38* (2018.01)
(52) U.S. Cl.
CPC .................................. *F16L 53/38* (2018.01)
(58) Field of Classification Search
CPC ............. F16L 53/38; B29L 2031/3493; H05B 2203/002; Y02A 50/20; Y02T 10/12
See application file for complete search history.

(56) References Cited

U.S. PATENT DOCUMENTS

| | | | | |
|---|---|---|---|---|
| 3,968,346 A | * | 7/1976 | Cooksley | F24H 1/225 392/377 |
| 4,815,769 A | * | 3/1989 | Hopperdietzel | H05B 3/58 285/47 |

(Continued)

FOREIGN PATENT DOCUMENTS

| | | |
|---|---|---|
| DE | 202007007849 U1 | 10/2008 |
| EP | 2222995 A1 | 9/2010 |

(Continued)

OTHER PUBLICATIONS

Dreidimensionale Schaltungen LPKF-LDS: Laser-Direktstrukturierung f?r 3D-Schaltungstr?ger, Retrieved from the Internet: <http://www.lpkf.de/_mediafiles/1963-lpkf-lds-prozess.pdf> (Sep. 2014).

*Primary Examiner* — Jesse S Bogue
(74) *Attorney, Agent, or Firm* — FISHERBROYLES, LLP; Roger L. Browdy

(57) ABSTRACT

Three-way heating shell, in particular for a motor vehicle fluid circuit, said shell being generally T-shaped or Y-shaped and comprising an inner passage having the same shape, in which passage a three-way fluid connection is intended to be housed, the shell being formed by two half-shells (10*a*) having the same shape which are attached to one another and together define the passage, the half-shells comprising semi-cylindrical surfaces (22, 24, 26) forming portions of the passage, the heating shell being characterised in that it comprises resistive heating circuits (28*a*, 28*b*) which are formed in situ on the semi-cylindrical surfaces.

23 Claims, 12 Drawing Sheets

(56) References Cited

U.S. PATENT DOCUMENTS

| | | | | |
|---|---|---|---|---|
| 5,704,113 | A * | 1/1998 | Mak | B29C 45/2737 |
| | | | | 219/541 |
| 8,526,801 | B2 | 9/2013 | Borgmeier et al. | |
| 8,591,241 | B2 * | 11/2013 | Rosenfeldt | F16L 53/38 |
| | | | | 439/193 |
| 9,429,259 | B2 * | 8/2016 | Borgmeier | F16L 53/38 |
| 9,890,889 | B2 * | 2/2018 | Lechner | F16L 25/01 |
| 2005/0083638 | A1 * | 4/2005 | Warren | F01P 11/20 |
| | | | | 361/600 |
| 2006/0252292 | A1 * | 11/2006 | Sonderegger | F16L 53/38 |
| | | | | 439/191 |
| 2007/0036528 | A1 * | 2/2007 | Ferrone | F16L 53/38 |
| | | | | 392/480 |
| 2010/0263740 | A1 * | 10/2010 | Borgmeier | F16L 25/01 |
| | | | | 137/341 |
| 2016/0223116 | A1 | 8/2016 | Borgmeier et al. | |

FOREIGN PATENT DOCUMENTS

| | | |
|---|---|---|
| EP | 2363627 A1 | 9/2011 |
| EP | 2892743 A1 | 7/2015 |
| FR | 2516439 A1 | 5/1983 |

* cited by examiner

[Fig.1]
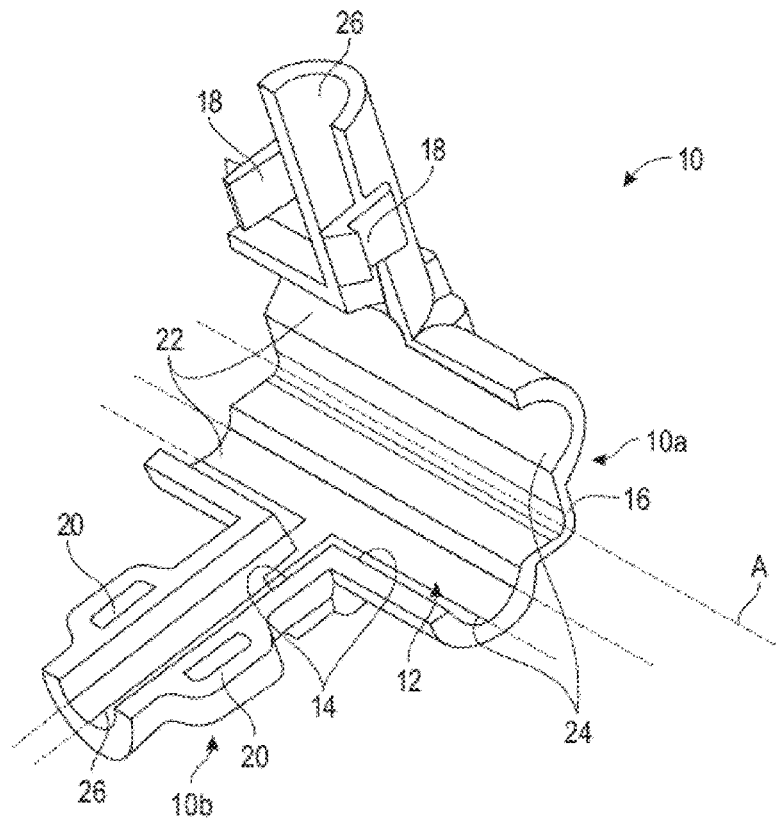
[Fig.2]
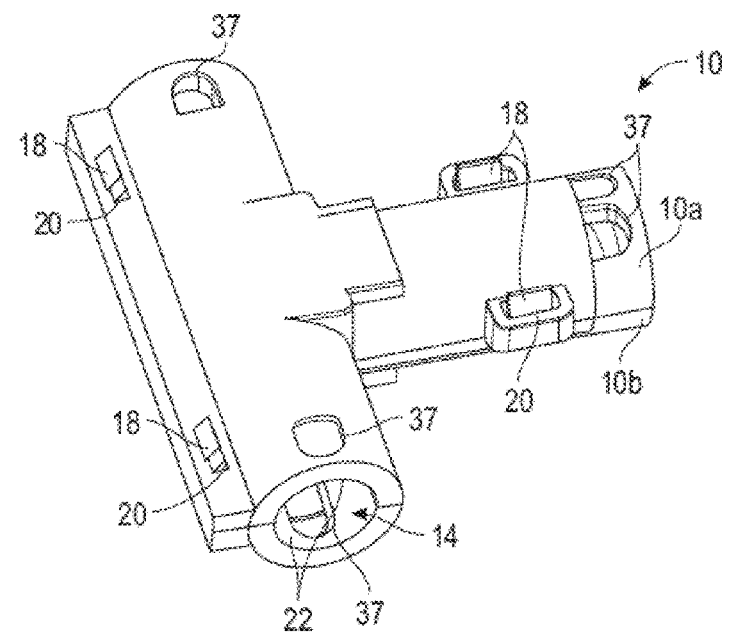

[Fig.3]
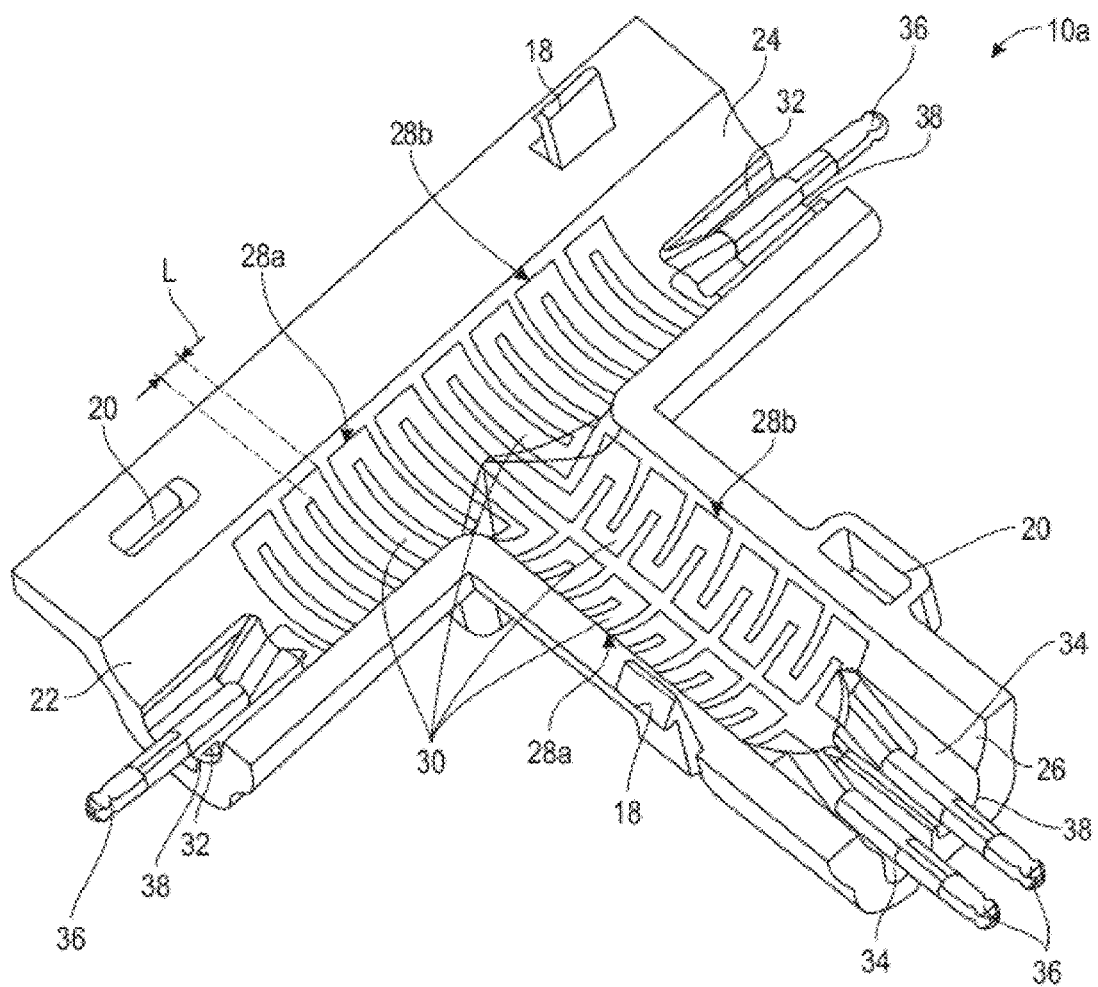

[Fig.4]
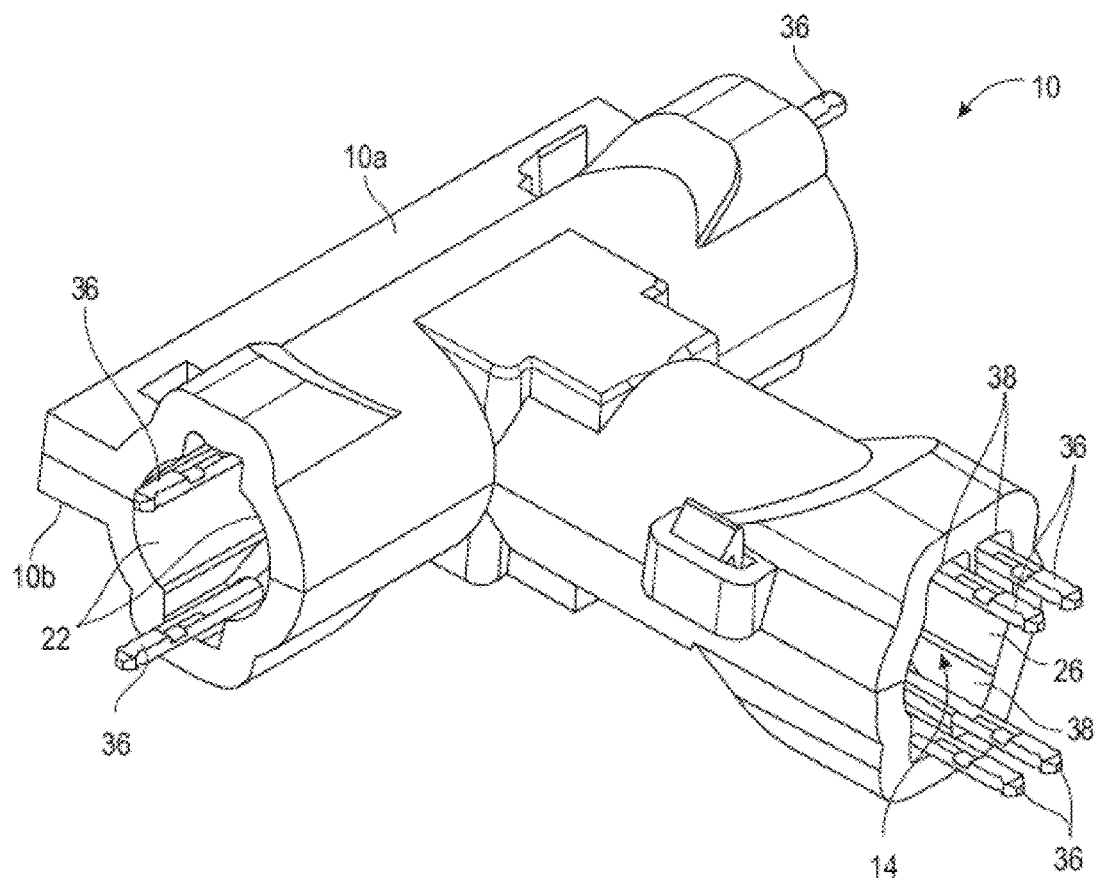

[Fig.5]
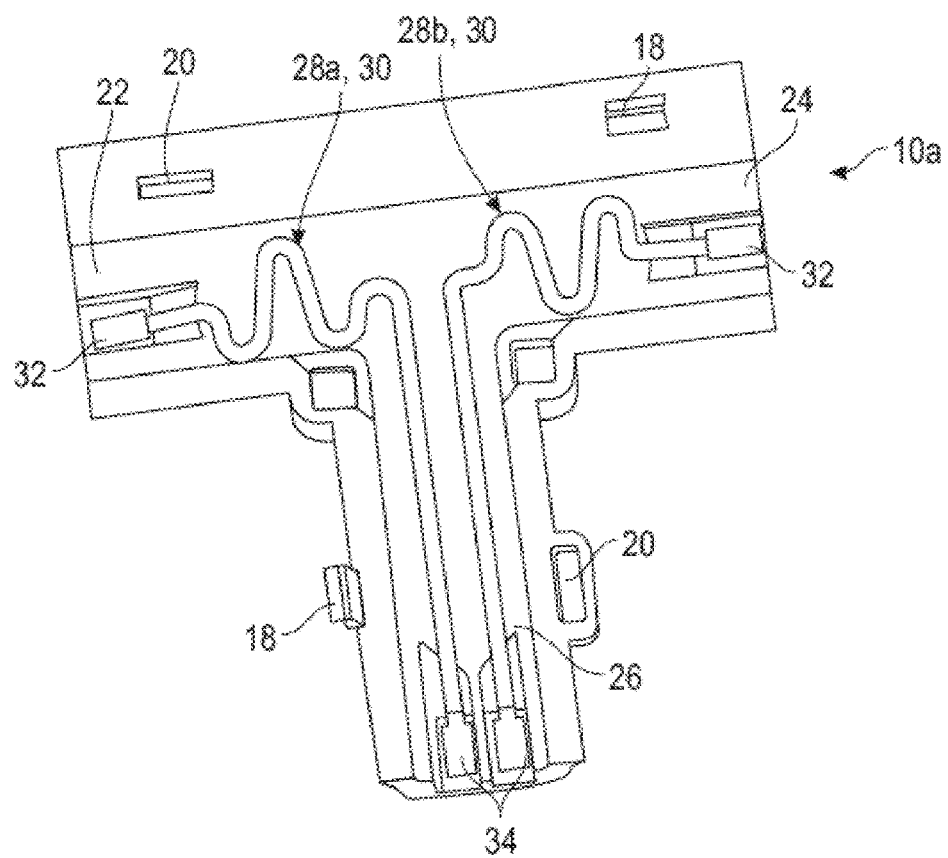

[Fig.6]
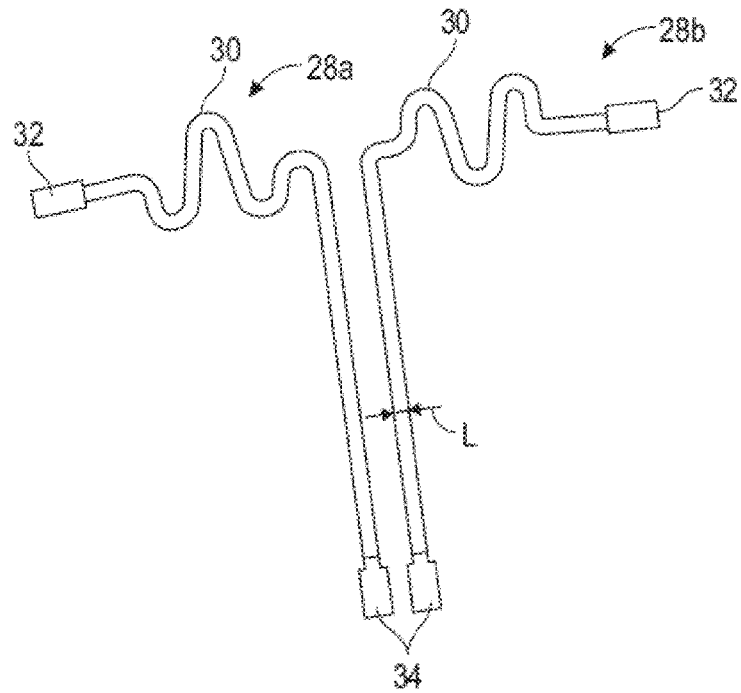
[Fig.7]
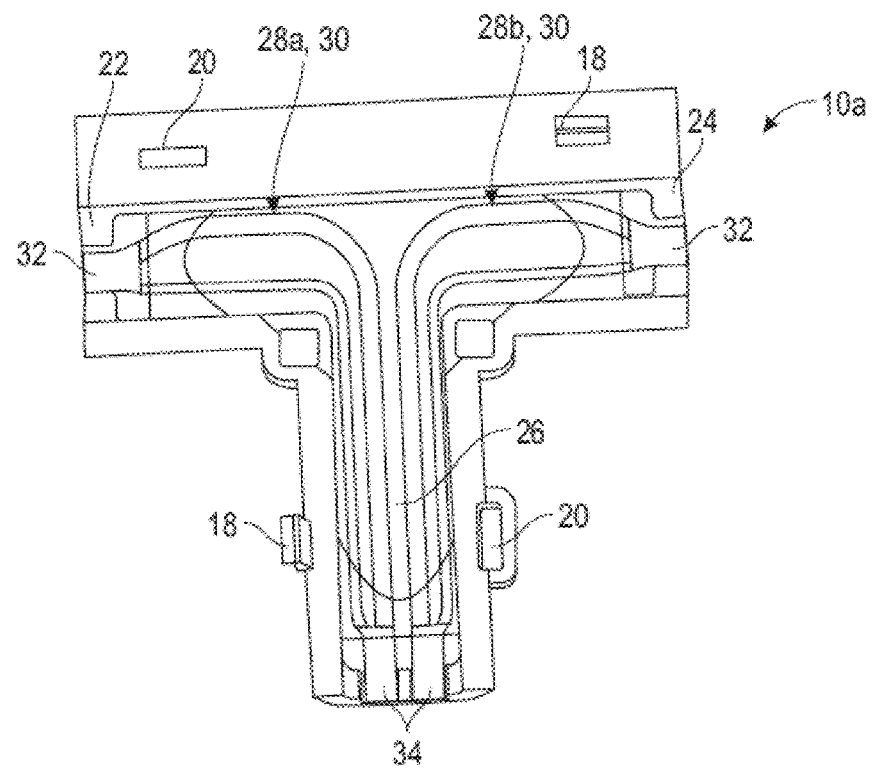

[Fig.8]
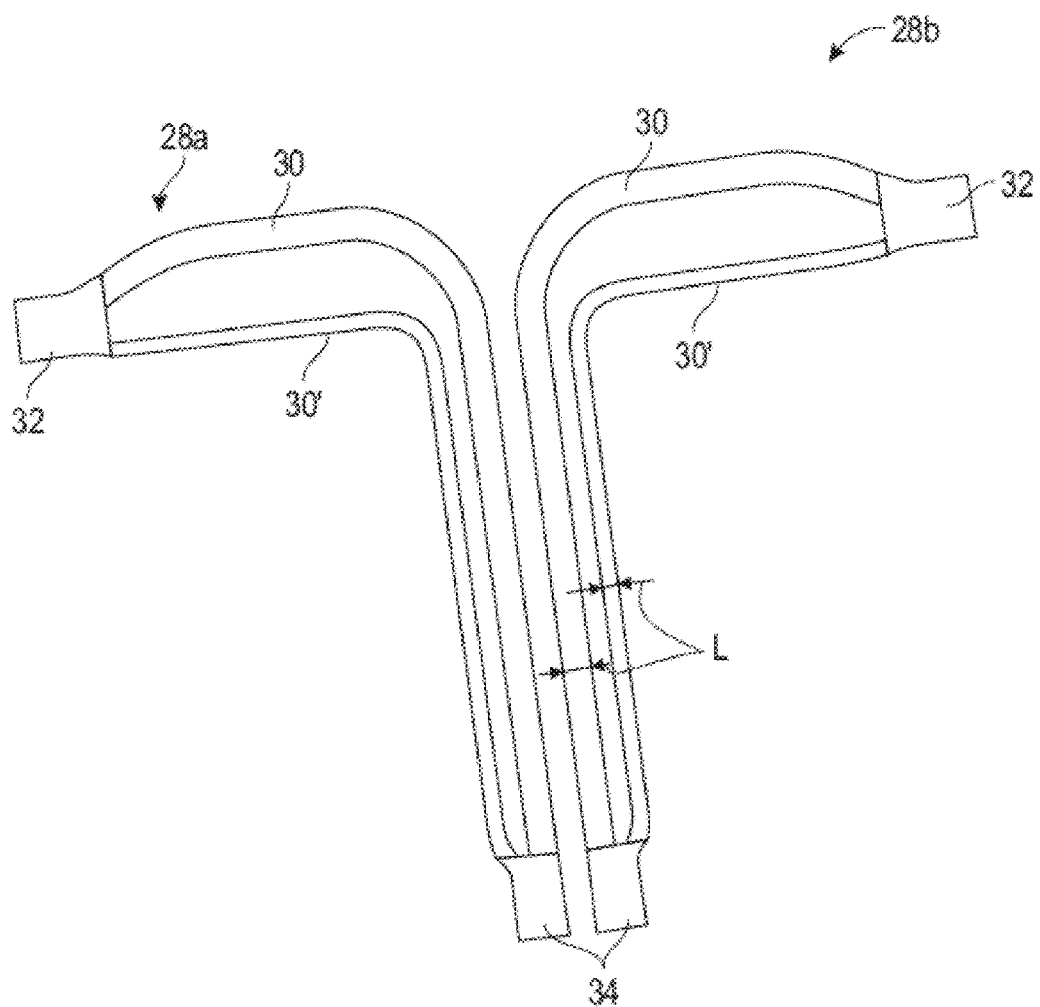

[Fig.9a-9f]
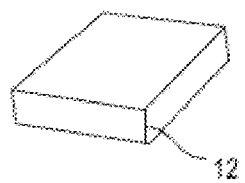
[Fig.9a]
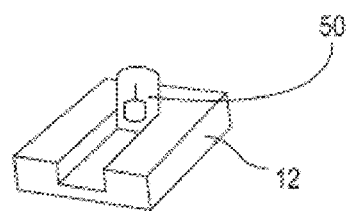
[Fig.9b]
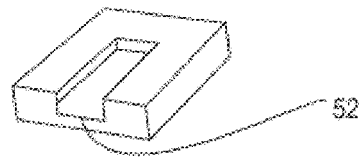
[Fig.9c]
[Fig.9d]
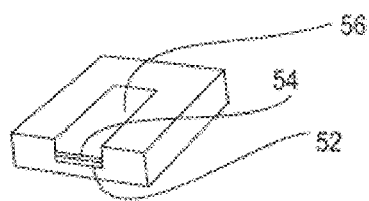
[Fig.9e]
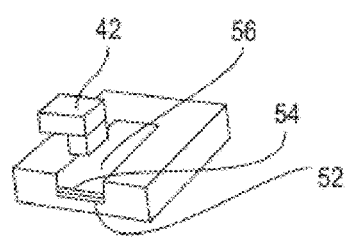
[Fig.9f]

[Fig.10]
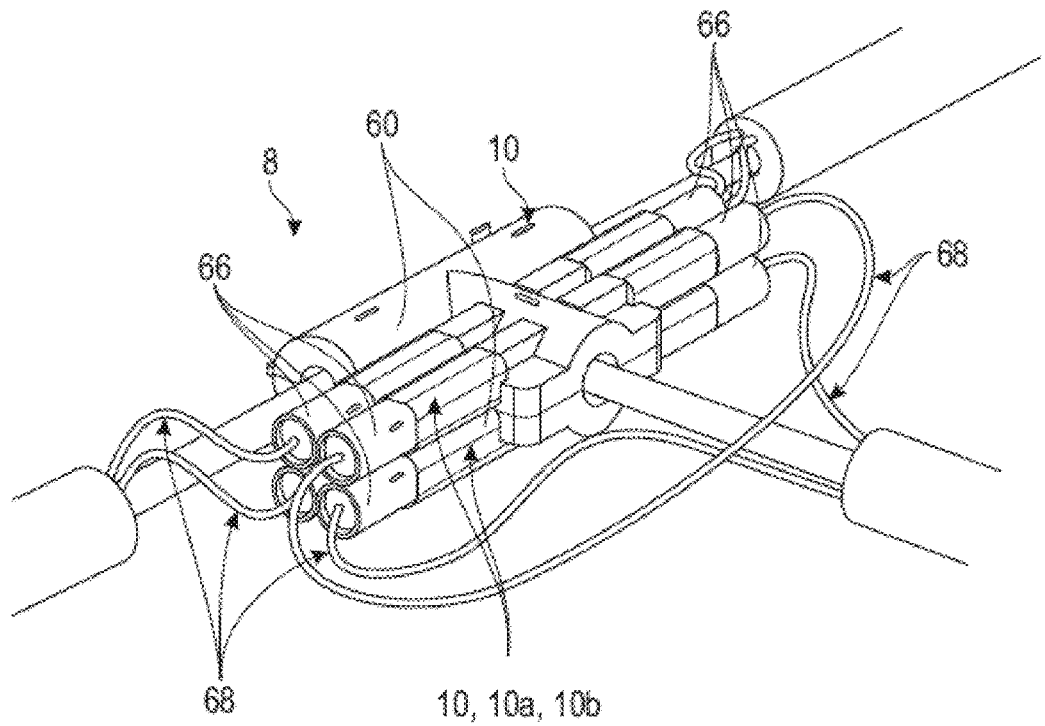
[Fig.11]
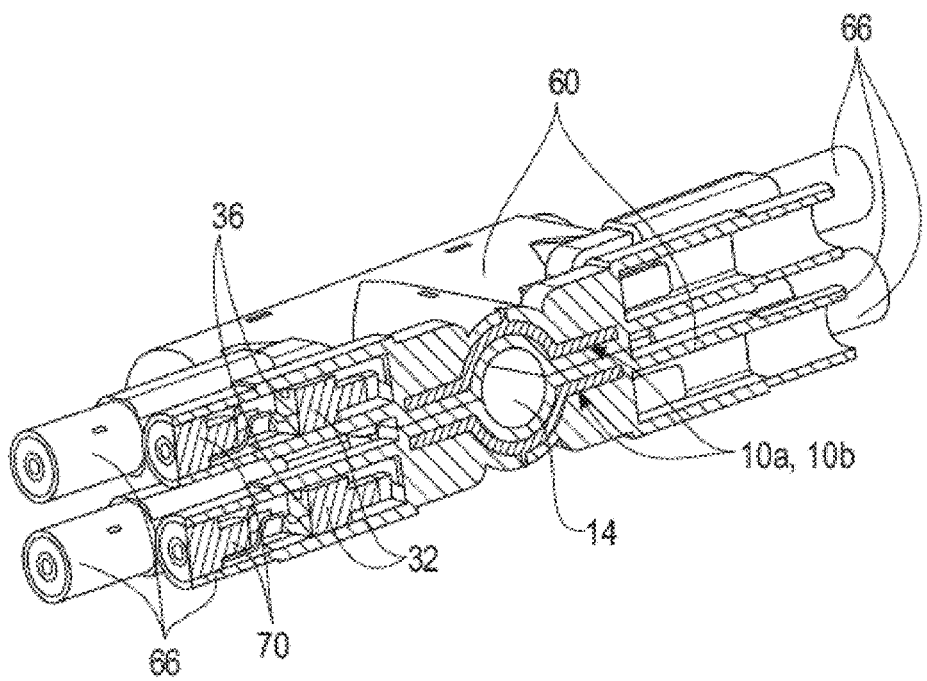

[Fig.12]
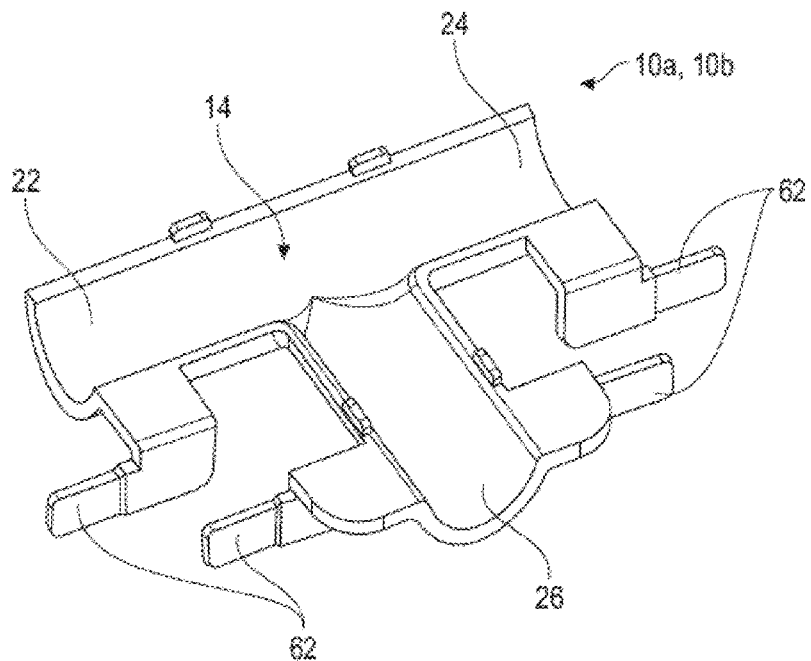
[Fig.13]
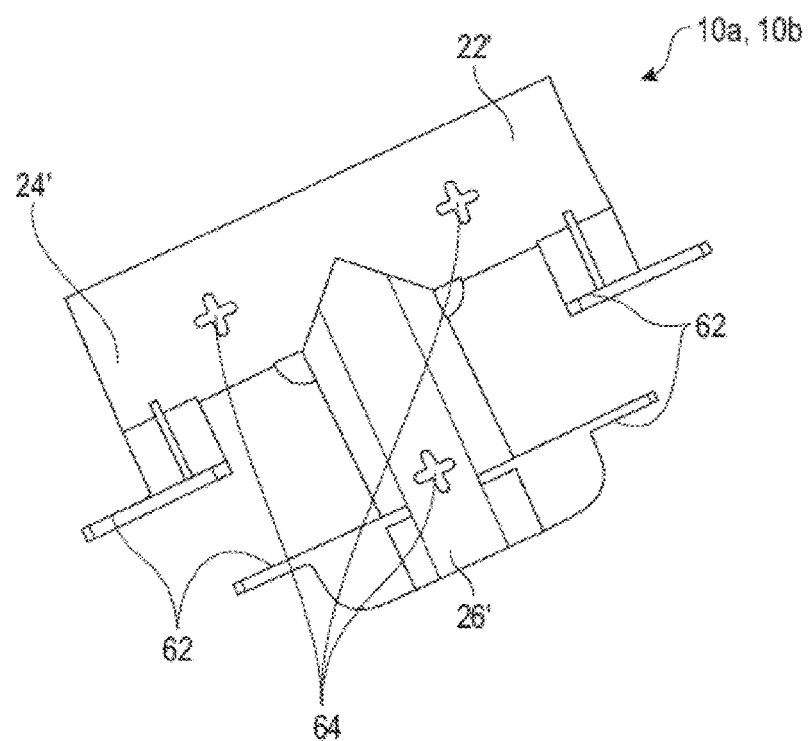

[Fig.14]
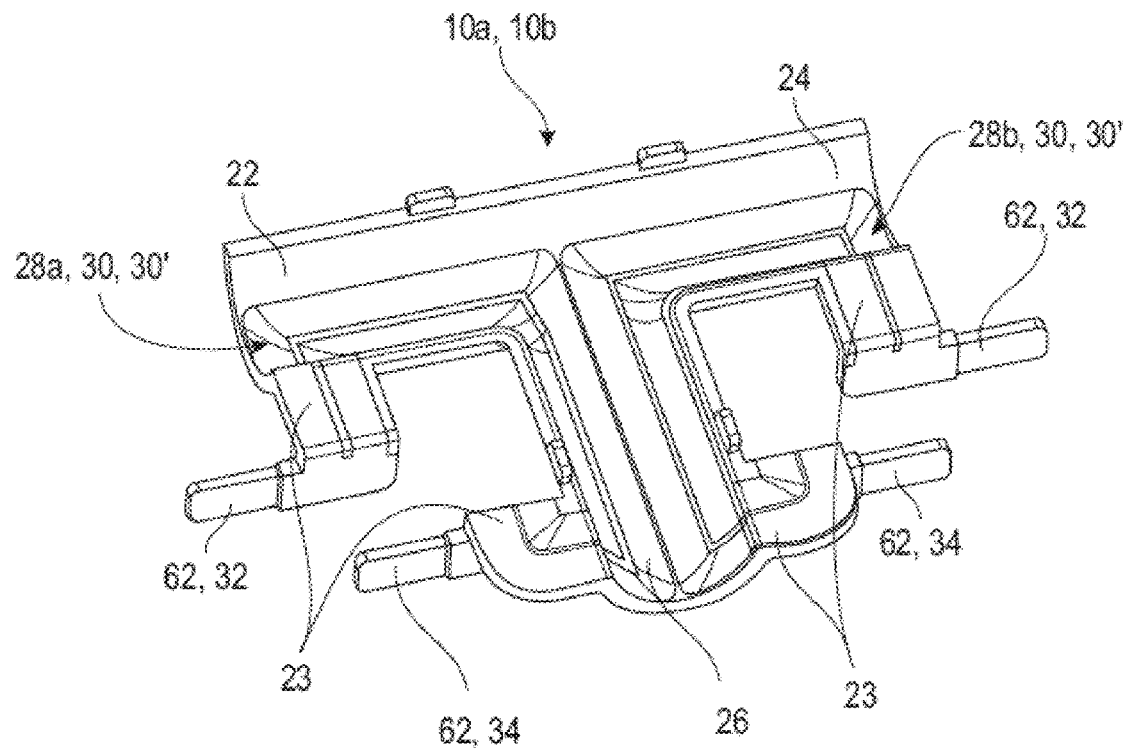
[Fig.15]
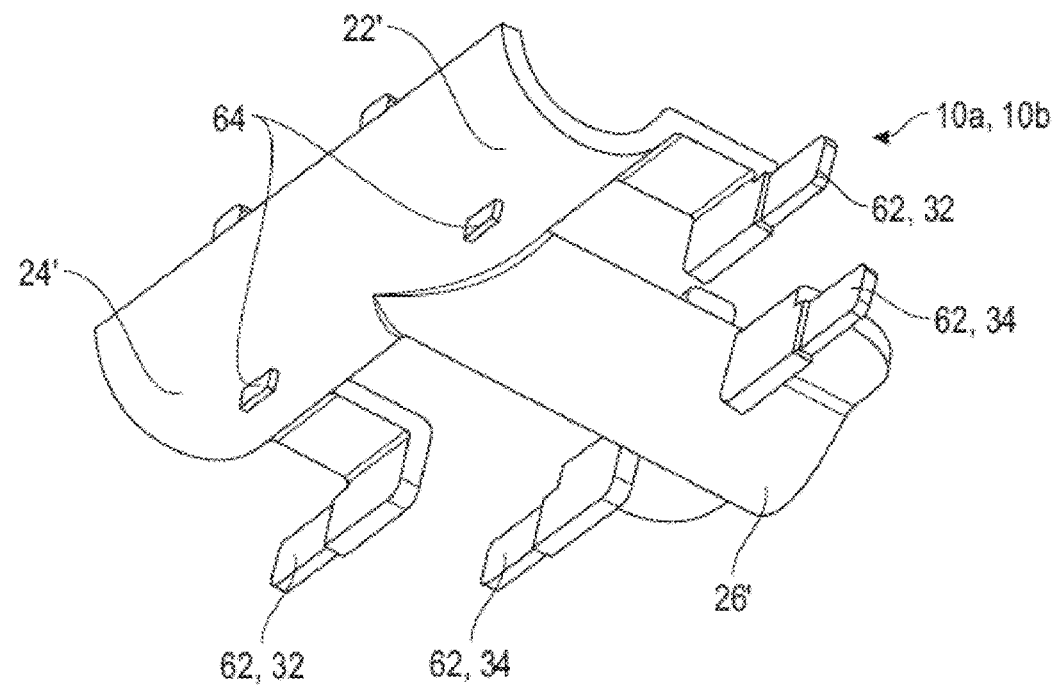

[Fig.16]
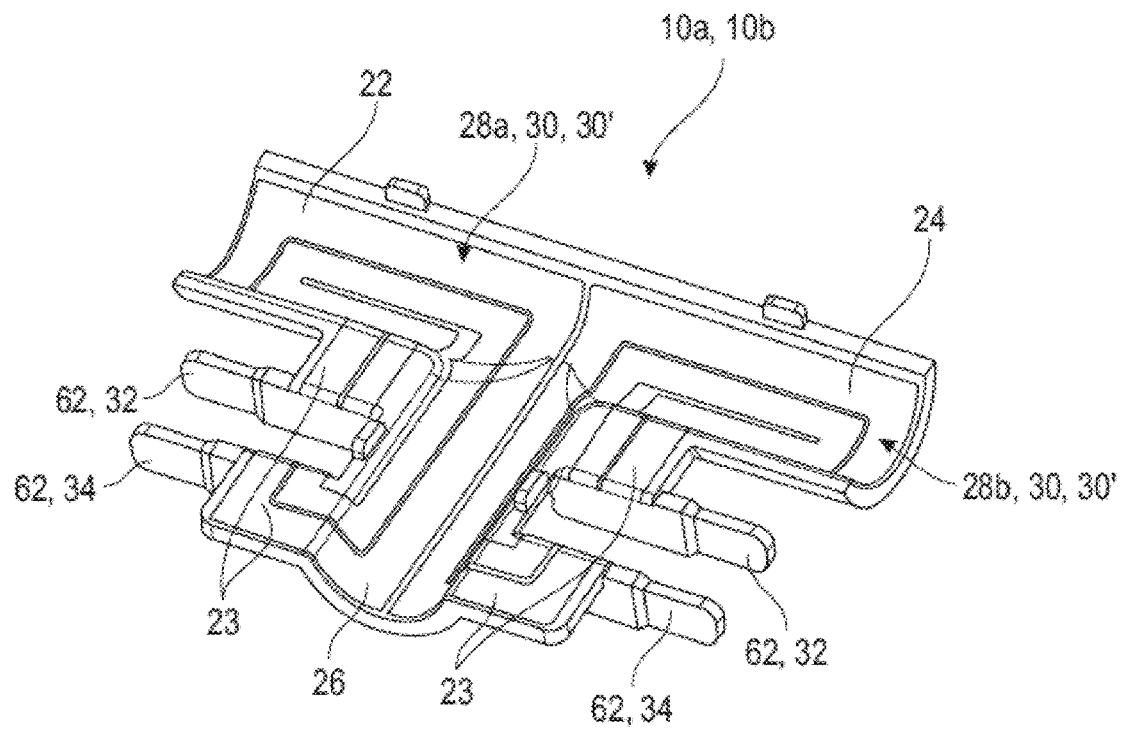
[Fig.17]
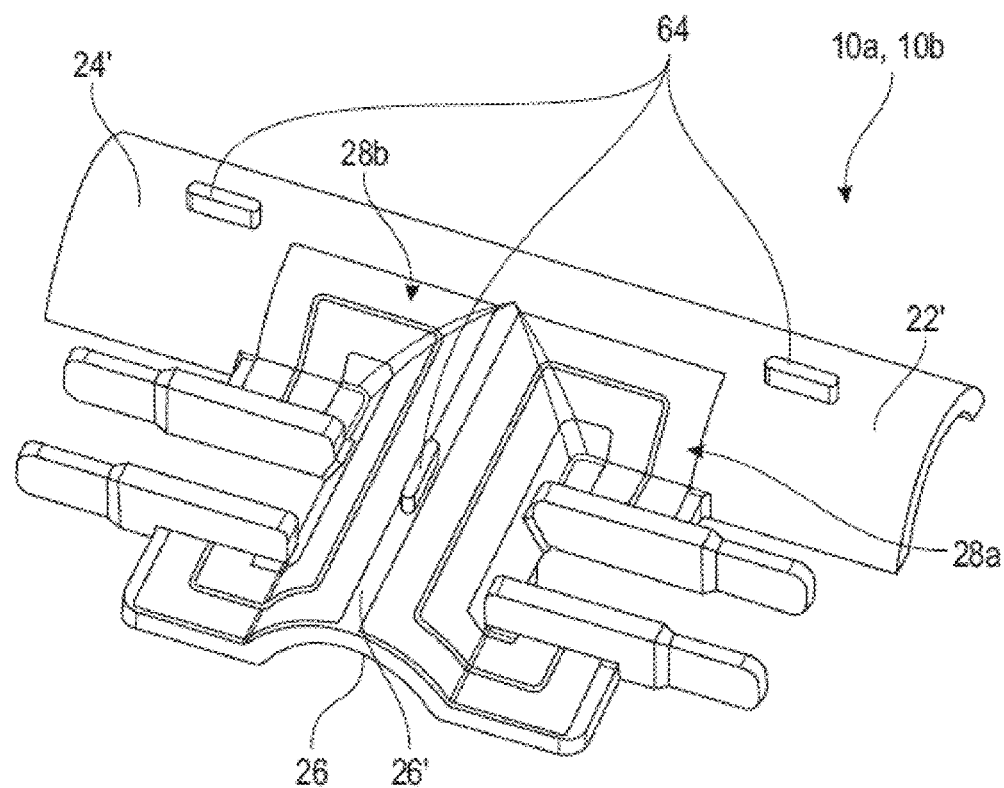

[Fig.18]
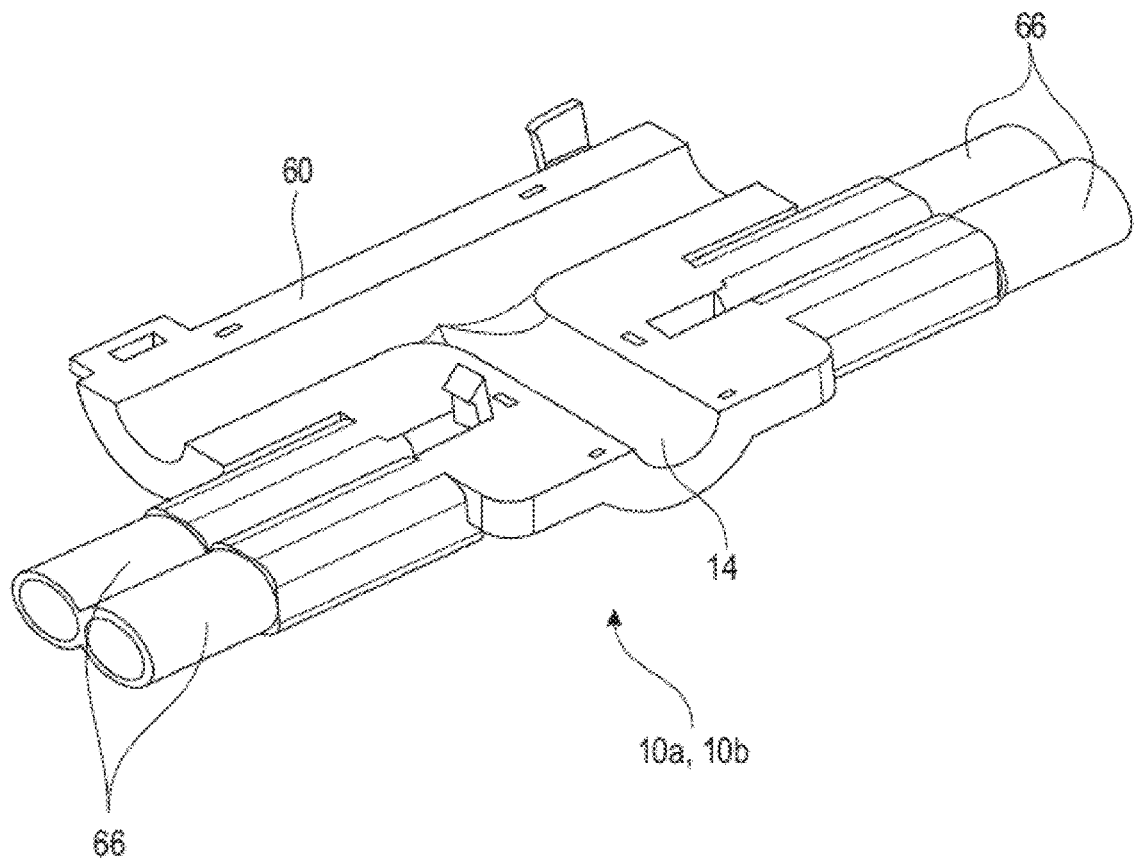

HEATING SHELL FOR THREE-WAY CONNECTOR

TECHNICAL FIELD OF THE INVENTION

The present invention relates in particular to a heating shell for three-way connector, in particular for a motor vehicle fluid circuit.

TECHNICAL BACKGROUND

A fluid system in a motor vehicle can comprise means for heating the fluid to prevent the temperature of the fluid from falling below a certain threshold, which could cause the circuit and the vehicle to malfunction.

This is the case, for example, of a leak circuit of the gases of an internal combustion thermal engine, for the passage of the gases from the combustion chamber to the casing of the engine, widely referred to as "blow-by". The gaseous residues of the combustion of the engine that accumulate in the engine casing are re-injected into the air intake pipe of the engine and may contain in particular water.

In very cold weather, this water can freeze and cause the pipe to become blocked, which can lead, in case of blockage, to an increase in pressure in the engine casing, which in turn can cause the lubricating oil contained in the engine casing to be evacuated from the measuring gauge sockets. This can result in significant damage to the engine.

The fluid circuit is then equipped with fluid heating means to avoid this problem, as described in the document FR-A1-2 943 718.

Another example of fluid circuit equipped with heating means is an SCR (*Selective Catalytic Reduction*) pollution control circuit, as described in the document EP-A1-2 363 627.

The urea solution intended to be mixed with the exhaust gases is susceptible to freezing and is therefore known to be heated to ensure the proper operation of the SCR circuit.

In general, the heating of a fluid in a fluid circuit of a motor vehicle is done by means of a conduit equipped with heating means or a fluidic connection device equipped with heating means.

The present invention proposes an enhancement to these technologies that can be adapted to an existing fluid circuit and therefore does not necessarily require a modification of that circuit.

SUMMARY OF THE INVENTION

The present invention concerns a heating shell for three-way connector, in particular for a motor vehicle fluid circuit, this shell having a general T or Y shape and comprising an internal passage of the same shape in which a three-way fluidic connector is intended to be housed, the shell being formed by two half-shells of the same shape attached to each other and delimiting said passage between them, the half-shells comprising semi-cylindrical surfaces forming segments of the passage, characterised in that it comprises resistive heating circuits which are formed in situ on said semi-cylindrical surfaces.

The invention thus proposes to integrate heating means directly into the shell and not into the fluidic connector intended to be housed in this shell. The shell can be made of a plastic or composite material. The shell can have a mechanical protection function of the connector and/or an insulation function, in particular thermal, of the connector.

As used in this application, a "three-way connector" is any element comprising three fluid circulation paths that communicate with each other. It can be a pipe, a conduit, an end-piece, a connecting element, etc.

The shell according to the invention may comprise one or more of the following characteristics, taken alone or in combination with each other:

- each circuit comprises at least one elongated resistive track whose longitudinal ends are connected to electric connecting terminals;
- the resistive track forms a serpentine;
- the resistive track has a width less than or equal to 5 mm, and for example less than or equal to 1 mm;
- the resistive track is less than or equal to 0.5 mm thick;
- the terminals are welded to the ends of electrical wires or to electrical lugs;
- the terminals or lugs extend from said passage, at least partly outside said passage;
- the terminals or lugs are located entirely outside said passage;
- each half-shell comprises at least one, and preferably at least two, resistive heating circuits whose connecting terminals are independent;
- each half-shell comprises three semi-cylindrical surfaces, a first resistive heating circuit extending over first and second of the semi-cylindrical surfaces, and a second resistive heating circuit extending over the second and a third of the semi-cylindrical surfaces;
- one connecting terminal is located on each of the first and third surfaces for electric connection of the ends of the tracks of the first and second circuits located on those surfaces, and two connecting terminals are located on said second surface for electric connection of the ends of the tracks of the first and second circuits located on that surface;
- the connecting terminals are connected to the tracks by extensions of these tracks which extend outside said semi-cylindrical surfaces;
- the connecting terminals are located on two opposite parallel faces of tabs of each half-shell;
- the circuits extend over internal or concave semi-cylindrical surfaces, or both internal or concave semi-cylindrical surfaces and external or convex semi-cylindrical surfaces;
- each half-shell is coated with a sealing coating of dielectric material, which at least partially covers said circuits;
- said coating covers the entire half-shell except for said terminals;
- said coating forms tubular sleeves around each of said terminals;
- each half-shell comprises at least one protruding element configured to cooperate with a wall of a mould to ensure a positioning of the half-shell upon an injection of the dielectric material into the mould;
- the circuits are configured to provide a thermal power between 0.5 and 10 W.

The present invention also relates to a fluid circuit, in particular for a motor vehicle, comprising at least one shell as described above. This is for example an SCR circuit.

The present invention also relates to a method for manufacturing a shell as described above, wherein it comprises a step (a) of producing the circuits by a technique selected from printing a resistive or conductive ink and the selective metallization.

A resistive ink is often an ink with a semi-conductive charge (carbon type). It would also be possible to produce a resistive track with a conductive ink (charged with metal) by adapting for example the dimensions of the track.

The selective metallization can be done by laser followed by immersion in one or more metallization baths (electrolytic or non-electrolytic deposition). The laser can be used to produce a chemical modification of the treated surface and/or to increase the roughness of this surface.

The material of the shell may comprise an additive intended to be laser activated and to facilitate the hooking of one or more metal layers upon the immersion or the successive immersions.

The shell can be produced by two-material injection into a mould, of a first material having an affinity for an electrically conductive and resistive material, and of a second non-electrically conductive material.

The ink can be printed by inkjet, aerosol jet, stamping, or any other suitable technique.

Advantageously, the step (a) is followed by a step (b) of coating each half-shell with a sealing coating of dielectric material, which at least partially covers said circuits.

This coating step (b) is preferably produced by injecting the dielectric material into a mould inside which each half-shell is previously arranged.

BRIEF DESCRIPTION OF THE FIGURES

Further characteristics and advantages of the invention will become apparent from the following detailed description, for the understanding of which reference is made to the attached drawings in which:

FIG. 1 is a schematic perspective view of a three-way connector shell for a fluid circuit of a motor vehicle, with the shell open, FIG. 2 is a schematic perspective view of another similar shell, this time in the closed position, FIG. 3 is a schematic perspective view of a half-shell according to a first embodiment of a shell according to the invention, FIG. 4 is a schematic perspective view of the first embodiment of the shell in the closed position, FIG. 5 is a schematic perspective view of a half-shell according to a second embodiment of a shell according to the invention, FIG. 6 is a schematic perspective view of resistive heating circuits of the half-shell of FIG. 5, FIG. 7 is a schematic perspective view of a half-shell according to a third embodiment of a shell according to the invention, FIG. 8 is a schematic perspective view of the resistive heating circuits of the half-shell of FIG. 7, FIGS. 9a-9f are very schematic views of an injected plastic half-shell being metallized, and illustrates an LDS metallization method, FIG. 10 is a schematic perspective view of a portion of a fluid circuit comprising in particular a heating shell according to an embodiment of the invention, which contains a fluidic connector connected to three fluid conduits, FIG. 11 is a schematic cross-sectional view of the circuit in FIG. 10, FIG. 12 is a schematic perspective view of one of the half-shells of the shell of FIG. 10, without its circuits and its coating, FIG. 13 is another schematic perspective view of one of the half-shells of the shell of FIG. 10, without its circuits and its coating, FIG. 14 is a view similar to FIG. 12 and shows the half-shell with its circuits but without its coating, FIG. 15 is a view similar to FIG. 13 and shows the half-shell with its circuits but without its coating, FIG. 16 is a view similar to that of FIG. 14 but with a variant of embodiment of the circuits, FIG. 17 is a view similar to that of FIG. 13 but with an alternative embodiment of the circuits, and FIG. 18 is a schematic perspective view of one of the half-shells of the shell of FIG. 13, with its circuits and its coating.

DETAILED DESCRIPTION OF THE INVENTION

FIG. 1 shows a shell 10 of a three-way connector 12 for a fluid circuit of a motor vehicle. The fluid circuit can be a fuel feeding circuit, an air conditioning circuit, a vacuum brake circuit, an SCR circuit, etc.

The three-way connector 12 is shown very schematically and has a general T-shape in the example shown. Alternatively, it could be Y-shaped. Classically, this connector 12 defines three distinct ways that meet at a single point. In the case where one of the way forms a fluid inlet, it is understood that the other two ways form fluid outlets. In the case where two of the ways form fluid inlets, it is understood that the last way forms a fluid outlet.

The fluid can be a gas or a liquid. Examples include fuel, a cooling liquid, a leak gas from an internal combustion thermal engine, a urea solution, etc.

The shell 10 comprises a T-shaped internal passage 14 in which the three-way connector 12 is intended to be housed.

The shell 10 is formed by two half-shells, respectively upper 10a and lower 10b. The half-shells 10a, 10b are T-shaped and are attached to each other to delimit the passage 14 between them.

In the example shown in FIG. 1, the half-shells 10a, 10b are secured to each other by a web of material 16 which acts as a hinge and therefore defines an axis A for pivoting the half-shell 10b with respect to the half-shell 10a and vice versa. The half-shells 10a, 10b are thus made inseparable.

The half-shells 10a, 10b are here attached to each other by an elastic snap-fit system comprising a plurality of hooks 18 carried by one of the half-shells and configured to cooperate with complementary slots 20 or recesses of the other of the shells. This cooperation ensures that the half-shells 10a, 10b are held together.

The half-shells comprise semi-cylindrical surfaces 22, 24, 26 forming segments of the passage 14.

The surfaces 22, 24 of each half-shell are coaxial in the example shown and extend one after the other. They respectively define passage segments for two of the ways. The surface 26 extends in a direction perpendicular to the other surfaces 22, 24 and is connected to both surfaces.

After closing the shell 10, it is understood that the surfaces 22, 24, 26 define between them the passage 14 which has in cross-section a generally circular shape.

In the variant shown in FIG. 2, the two half-shells 10a, 10b are independent in that they are not connected by a web of material. They comprise more elastic snap-fit systems to ensure their retention.

The shell 10 and the half-shells 10a, 10b are preferably made of a plastic or composite material.

The invention proposes to equip a shell 10 of this type with heating means and proposes several embodiments shown in FIG. 3 and following. According to the invention, these heating means comprise resistive heating circuits which are formed in situ on the semi-cylindrical surfaces 22, 24, 26 of the half-shells 10a, 10b.

FIGS. 3 and 4 illustrate a first embodiment. FIG. 3 shows a half-shell 10a (both half-shells are similar) and FIG. 4 shows the shell 10 in the closed or assembled position.

Each half-shell 10a, 10b comprises two resistive heating circuits 28a, 28b. The two circuits 28a, 28b are independent, i.e. they are fed with electricity independently and can be operated and therefore controlled independently of each other.

Each circuit 28a, 28b comprises at least one elongated resistive track 30 whose longitudinal ends are connected to electric connecting terminals 32, 34. Since each half-shell 10a, 10b comprises two circuits 28a, 28b, each half-shell comprises four terminals 32, 34, and thus the entire shell (with its two half-shells) comprises eight terminals 32, 34, as seen in FIG. 4.

FIG. 3 allows to show that each track 30 forms a serpentine.

In the example shown, each track 30 has a length greater than or equal to 30 mm and a width L less than or equal to 5 mm, and for example less than or equal to 1 mm. The resistive track 30 is less than or equal to 0.5 mm thick.

The terminals 32, 34 are formed here by electrical lugs 36 fitted and welded to the ends of the tracks 30. These lugs 36 are elongated in this case and are preferably housed in recesses 38 of the half-shells so as to avoid obstructing the passage 14 for mounting the three-way connector. The remaining lugs 36 extend out of the passage 14 and are accessible for connection to one or more electric connectors (FIG. 4).

Alternatively, the lugs 36 could pass through orifices 37 in the half-shells 10a, 10b, such as those shown in FIG. 2.

The heating circuit 28a, i.e., a first track 30, extends over the surfaces 22 and 26, and the second heating circuit 28b, i.e., a second track 30, extends over the surfaces 24 and 26.

FIG. 3 allows to show that the surface 22 comprises only the circuit 28a, the surface 24 comprises only the circuit 28b, and the surface 26 comprises both circuits 28a, 28b whose tracks 30 are justly shaped and sized so that they can both be located on a same surface.

Due to the semi-cylindrical shapes of the surfaces 22, 24, 26, the tracks 30 have curved shapes.

It can also be seen that the terminal 32 connected to the circuit 28a is located on the surface 22, the terminal 32 connected to the circuit 28b is located on the surface 24, and the terminals 34 connected to the circuits 28a, 28b are located on the surface 26.

FIGS. 5 and 6 illustrate a second embodiment. FIG. 5 shows one of the half-shells 10a (both half-shells being similar) of the heating shell, and FIG. 6 shows the resistive heating circuits 28a, 28b of each half-shell.

Each half-shell comprises two resistive heating circuits 28a, 28b. The two circuits are independent, i.e. they are fed with electricity independently and can be operated and therefore controlled independently of each other.

Each circuit 28a, 28b comprises at least one elongated resistive track 30 whose longitudinal ends are connected to electric connecting terminals 32, 34. Since each half-shell comprises two circuits, each half-shell comprises four terminals 32, 34 and thus the entire shell (with its two half-shells) comprises eight terminals 32, 34.

From FIG. 6, it can be seen that each track 30 forms a serpentine along at least one portion of its length.

In the example shown, each track 30 has a length greater than or equal to 30 mm and a width L less than or equal to 5 mm, and for example less than or equal to 1 mm. The resistive track 30 is less than or equal to 0.5 mm thick.

The terminals 32, 34 are formed here by enlargements of the ends of the tracks 30. The electric connection of the circuits 28a, 28b can be produced by means of conductive wires whose longitudinal ends are welded to the terminals 32, 34 respectively. It is therefore understood that the terminals 32, 34 are advantageously sized to receive a welding point.

The heating circuit 28a, i.e., a first track 30, extends over the surfaces 22 and 26, and the second heating circuit 28b, i.e., a second track 30, extends over the surfaces 24 and 26.

FIG. 5 allows to show that surface 22 comprises only the circuit 28a, the surface 24 comprises only the circuit 28b, and the surface 26 comprises both circuits 28a, 28b whose tracks 30 are straight.

Due to the semi-cylindrical shapes of the surfaces 22, 24, 26, the tracks 30 have curved shapes, in particular on the surfaces 22, 24.

It can also be seen that the terminal 32 connected to the circuit 28a is located on the surface 22, the terminal 32 connected to the circuit 28b is located on the surface 24, and the terminals 34 connected to the circuits 28a, 28b are located on the surface 26.

FIGS. 7 and 8 illustrate a third embodiment. FIG. 7 shows one of the half-shells 10a (both half-shells are similar) of the heating shell, and FIG. 8 shows the resistive heating circuits 28a, 28b of each half-shell.

Each half-shell comprises two resistive heating circuits 28a, 28b. The two circuits are independent, i.e. they are fed with electricity independently and can be operated and therefore controlled independently of each other.

Each circuit 28a, 28b comprises two elongated resistive tracks 30, 30' whose longitudinal ends are connected to electric connecting terminals 32, 34. Since each half-shell comprises two circuits 28a, 28b, each half-shell comprises four terminals 32, 34 and thus the entire shell (with its two half-shells) comprises eight terminals 32, 34.

From FIG. 8, it can be seen that the two tracks 30, 30' of each circuit 28a, 28b are generally L-shaped and extend parallel to each other.

In the example shown, each track 30 has a length greater than or equal to 30 mm and a width L less than or equal to 5 mm, and for example less than or equal to 1 mm. The resistive track 30 is less than or equal to 0.5 mm thick.

The terminals 32, 34 are formed here by enlargements of the ends of the tracks 30. The electric connection of the circuits 28a, 28b can be produced by means of conductive wires whose longitudinal ends are welded to the terminals 32, 34 respectively. It is therefore understood that the terminals 32, 34 are advantageously sized to receive a welding point.

The heating circuit 28a, i.e. its tracks 30, 30', extend over the surfaces 22 and 26, and the second heating circuit 28b, i.e. its tracks 30, 30', extend over the surfaces 24 and 26.

FIG. 7 allows to show that surface 22 comprises only the circuit 28a, the surface 24 comprises only the circuit 28b, and the surface 26 comprises both circuits 28a, 28b whose tracks are precisely shaped and sized so that they can both be located on a same surface.

It can also be seen that the terminal 32 connected to the circuit 28a is located on the surface 22, the terminal 32 connected to the circuit 28b is located on the surface 24, and the terminals 34 connected to the circuits 28a, 28b are located on the surface 26.

FIG. 10 and following illustrate another embodiment of the shell 10 in which the two half-shells 10a, 10b are coated with a sealing coating 60 made of a dielectric material.

FIGS. 10 and 11 show the shell 10 in the condition of use in a fluid circuit 8, the shell containing a three-way connector connected to three fluid conduits. FIGS. 12 and 13 show a half-shell 10a, 10b without its coating and its heating circuits 28a, 28b. FIGS. 16 and 17 show a half-shell 10a, 10b equipped with heating circuits 28a, 28b and FIGS. 18 and 19 show a half-shell 10a, 10b equipped with a variant embodiment of the heating circuits 28a', 28b'. Finally, FIG. 18 shows a half-shell 10a, 10b equipped with its sealing coating 60.

The half-shells 10a, 10b differ from those described in the foregoing in particular in that they comprise tabs 62 located outside the passage 14 and intended to form supports for electrical terminals 32, 34 for connecting the resistive heating circuits 28a, 28b or 28a', 28b'. These terminals are therefore located outside the passage 14.

In the example shown, the tabs 62 extend parallel to each other and to the common axis of the surfaces 22, 24. Each of these tabs comprises two opposite parallel faces.

FIG. 12 shows one side of each half-shell 10a, 10b and the internal semi-cylindrical or concave surfaces 22, 24, 26 that define a portion of the passage 14, and FIG. 13 shows an opposite side of the half-shell and the external semi-cylindrical or convex surfaces 22', 24', 26'. The surfaces 22', 24', 26' extend coaxially around the surfaces 22, 24 and 26, respectively.

FIG. 13 further shows that each half-shell 10a, 10b comprises at least one protruding element 64 configured to cooperate with a wall of a mould to ensure a positioning of the half-shell during an injection of the dielectric material of the coating 60 into the mould.

In the example shown, an element 64 shaped like a flat or cross pin is located on each of the surfaces 22', 24', 26' and is configured to rest on walls of the mould to precisely position the half-shell in the mould and ensure a precise clearance between the surfaces 22', 24', 26' and the walls of the mould. This clearance is intended to be filled with the material of the coating 60 to form a coating of constant thickness on these surfaces. The entire half-shell can be coated in this way, except for the terminals 32, 34 which must remain free for electric connection.

FIG. 18 shows an example of embodiment of a coated half-shell. The coating 60 advantageously has two functions. A first function of protection of the resistive circuits 28a, 28b and their tracks, which are intended to be manufactured in situ on the half-shell before its coating, and a second function of sealing the electric connection of these circuits.

The coating 60 is made of dielectric material. It is chosen to have a good chemical affinity with the shell material 10.

As can be seen in FIG. 18, this coating 60 advantageously forms tubular sleeves 66 around each of the tabs 62 and thus around each of the terminals 32, 34. The terminals 32, 34 are thus protected from the outer environment, and in particular from moisture, and can be connected to electric wires 68, as seen in FIG. 10. FIG. 11 shows a cross-section of the circuit 8 at the level of some of the terminals of the half-shells 10a, 10b. In each sleeve 66 are mounted a lug 36 for electric connection to the corresponding terminal 32, 34, as well as a sealing cap 70 intended to be passed through in a sealed manner by a wire 68.

FIGS. 14 and 15 show a first embodiment of the circuits 28a, 28b which extend predominantly over the surfaces 22, 24, 26 but comprise extensions 23 which extend to the tabs 62 and are connected to the terminals 32, 34 located on the aforementioned two opposite faces of these tabs 62.

FIGS. 16 and 17 show a second embodiment of the circuits 28a', 28b' which extend partly across the surfaces 22, 24, 26 and partly across the surfaces 22', 24', 26'. These circuits 28a', 28b' comprise extensions 23 that extend to the tabs 62 and are connected to the terminals 32, 34 located on the aforementioned two opposite faces of these tabs 62.

The heating circuits of the shell are for example configured to provide a thermal power between 0.5 and 10 W.

The circuits 28a, 28b can be formed in situ in several ways, and in particular by a plastronic technique. The plastronic includes all techniques for printing printed electronics or selective metallization on a rigid substrate of plastic or composite material in three dimensions, and is also known as MID (which is the acronym for Moulded Interconnect Device).

The circuits 28a, 28b may be made, for example, by a technique selected from printing a resistive or conductive ink and selective metallization.

The ink can be printed by inkjet printing for example.

The selective metallization can be carried out by bi-material injection, of a first electrically conductive and resistive material and a second non-electrically conductive material, in a mould for manufacturing the shell. It is understood that the first material will form the tracks 30, 30' and the terminals 32, 34 and the second material will form a half-shell.

Alternatively, the first material could be non-conductive but only comprise an additive (such as copper germs) to facilitate the hooking of the circuits 28a, 28b.

Alternatively, the selective metallization can be produced by LDS (Laser Direct Structuring) technology, which is one of the MID technologies that allows to produce tracks on complex injected parts. The half-shells are manufactured from a material incorporating an organometallic additive (FIG. 9a). Then, a laser beam 50 directly engraves the tracks to activate the material through a physicochemical method between the additive and the laser (FIG. 9b). For the thin circuits, the metallization is produced by non-electrolytic deposition. Once this material has been activated, the shell is immersed in different baths containing metal ions (copper, then nickel, then gold) in order to produce several successive deposits 52, 54, 56 of metal in the activated area (FIGS. 9c-9e). The successive layers are for example of the type Cu/Ni/Au, Cu/Ni/Ag, Cu/Ni/(Pd/Au), Ni/Pd/Au, Cu/Ni, Cu/Sn, etc. The last step consists of welding the wires or attaching the lugs as mentioned above (FIG. 9f).

The thicknesses of the metal layers are for example;
Cu=15 µm max (preferably between 4 and 10 µm)
Ni=20 µm max (preferably less than 15 µm)
Au=1 µm max (normally 0.1 µm with tolerance of ±0.05 µm)

The relatively thick layers (more than 15 µm in the case of copper) are manufactured by electrolytic deposition, i.e. electroplating.

The metallizable polymers are thermoplastic polymers, liquid crystal polymers (LCP), some thermosetting resins and some cross-linked elastomers. For the applications requiring a high temperature resistance (110-150° C.), the PA and PPA, PPS type thermoplastics are preferable.

An LDS-compatible polymer typically comprises an additive adapted to produce germs on the surface of the shell by being laser-activated. It can be a copper-chromium oxide (CuO·Cr2O3) or an organic complex of Cu or Pd. Typically, a polymer of this type comprises between 1 and 15% by weight of LDS additive, the remainder being formed by the polymer matrix and any reinforcing fillers.

Several materials are currently available on the market for LDS applications, including TECACOMP® PEEK LDS black 3980 marketed by the company Ensinger, and the material Preperm 260 LDS (PPE) marketed by the company Premix.

There are also metallizable paints. The paint is sprayed onto a conventional polymer (without LDS additive) to make it metallizable.

Another type of metallization is the metallization referred to as bi-material injection (Two Shot Moulding or 2K Moulding). The plastic part is moulded in two successive injections, by a metallizable material and a conventional material. The first plastic is treated with a chemical mordant (such as a chromium acid or potassium hydroxide), and then the circuit is liquid deposited similar to the LDS (preferred non-electrolyte deposition) technique. The metals used, the thickness of the manufactured circuit and the method control are similar to those of the LDS technique.

These plastronic technologies allow the heating function to be directly fitted to the shell, reducing the number of components (wires), which lowers the cost, especially the labour cost.

There are other selective metallization techniques, such as those known as Hot Embossing or Plasmacoat 3D®. The first technique can shape metal patterns by stamping on polymers with a low glass transition temperature (Tg). As for Plasmacoat 3D®, it is the spraying of a metal through a plasma torch. This method allows the deposition of metallic patterns in copper or zinc for example.

For the realization of a heating shell 10 according to the embodiment of FIG. 10 and following, the step of in situ manufacturing of the circuits is followed by a step of coating each half-shell with the sealing coating 60. This coating is produced by injecting the dielectric material into a mould inside which each half-shell is previously arranged, as mentioned above.

The invention claimed is:

1. A heating shell for three-way connector, in particular for a motor vehicle fluid circuit, this shell having a general T or Y shape and comprising an internal passage of the same shape in which a three-way fluidic connector is intended to be housed, the shell being formed by two half-shells of the same shape attached to each other and delimiting said passage between them, the half-shells comprising semi-cylindrical surfaces forming segments of the passage, and wherein the heating shell further comprises resistive heating circuits which are formed in situ on said semi-cylindrical surfaces.

2. The shell according to claim 1, wherein each circuit comprises at least one elongated resistive track whose longitudinal ends are connected to electric connecting terminals.

3. The shell of claim 2, wherein the resistive track forms a serpentine.

4. The shell according to claim 1, wherein the terminals or lugs extend from said passage, at least partly, outside this passage.

5. The shell according to claim 1, wherein the terminals or lugs are located entirely outside said passage.

6. The shell according to claim 2, wherein each half-shell comprises at least one, and preferably at least two, resistive heating circuits whose connecting terminals are independent.

7. The shell according to claim 1, wherein each half-shell comprises three semi-cylindrical surfaces, a first resistive heating circuit extending over first and second of the semi-cylindrical surfaces, and a second resistive heating circuit extending over the second and a third of the semi-cylindrical surfaces.

8. The shell according to the claim 7, wherein the terminals or lugs extend from said passage, at least partly, outside this passage, and wherein one connecting terminal is located on each of the first and third surfaces for electric connection of the ends of the tracks of the first and second circuits located on these surfaces, and two connecting terminals are located on said second surface for electric connection of the ends of the tracks of the first and second circuits located on this surface.

9. The shell according to claim 7, wherein the terminals or lugs are located entirely outside said passage, and wherein the connecting terminals are connected to the tracks by extensions of these tracks which extend outside said semi-cylindrical surfaces.

10. The shell according to claim 7, wherein the connecting terminals are located on two opposite parallel faces of tabs of each half-shell.

11. The shell according to claim 7, wherein the circuits extend over internal or concave semi-cylindrical surfaces, or both internal or concave semi-cylindrical surfaces and external or convex semi-cylindrical surfaces.

12. The shell according to claim 1, wherein each half-shell is coated with a sealing coating of dielectric material, which at least partially covers said circuits.

13. The shell according to claim 12, wherein each circuit comprises at least one elongated resistive track having longitudinal ends connected to electric connecting terminals, and wherein said coating covers the entire half-shell except for said terminals.

14. The shell according to claim 12, wherein said coating forms tubular sleeves around each of said terminals.

15. The shell according to claim 12, wherein each half-shell comprises at least one protruding element configured to cooperate with a wall of a mould to ensure a positioning of the half-shell upon an injection of the dielectric material into the mould.

16. A fluid circuit, in particular for a motor vehicle, comprising at least one shell according to claim 1.

17. A method for manufacturing a shell according to claim 1, comprising a step of realizing the circuits by a technique selected from printing a resistive or conductive ink and the selective metallization.

18. The method of claim 17, wherein the selective metallization is produced by laser followed by immersion in one or more metallization baths.

19. The method of claim 17, wherein the material of the shell comprises an additive intended to be laser activated and to facilitate the hooking of one or more metal layers upon the immersion or successive immersions.

20. The method according to claim 17, wherein the shell is produced by two-material injection into a mould, of a first material having an affinity for an electrically conductive and resistive material, and of a second non-electrically conductive material.

21. The method of claim 16, wherein the ink is printed by inkjet or aerosol jet or stamping.

22. The method according to claim 17, wherein the step is followed by a step of coating each half-shell with a sealing coating of dielectric material, which at least partially covers said circuits.

23. The method according to claim 22, wherein the coating step is done by injecting the dielectric material into a mould inside which each half-shell is previously arranged.

* * * * *